3,434,863
LUMINESCENT FILMS CONTAINING
RARE EARTH OXIDES
Wilbur W. Hansen and Robert E. Myers, Menlo Park,
Calif., assignors to Stanford Research Institute, Menlo
Park, Calif., a corporation of California
No Drawing. Filed Feb. 3, 1965, Ser. No. 430,077
Int. Cl. C09k 1/00; C23c 13/00
U.S. Cl. 117—33.5                                    4 Claims

ABSTRACT OF THE DISCLOSURE

A method of forming efficient photon producing films on a substrate is disclosed. A phosphor powder material selected from a rare earth oxide such as yttrium oxide or a host rare earth oxide doped with an activator rare earth oxide such as yttrium oxide doped with europium oxide is placed adjacent to said substrate and vaporized. The vapors are condensed as a thin film on the substrate and the substrate is heated to the temperature of at least 800° C. The substrate can be heated while the vapors are condensing or after the vapors have condensed the substrate can be heated to a temperature of at least 800° C. in an oxygen containing atmosphere.

BACKGROUND OF THE INVENTION

Field of the invention

This invention relates to a method of making thin films and more particularly, the invention relates to a method of making thin films of $Y_2O_3$ and $Y_2O_3$ doped with rare earth oxides to produce cathodoluminescence.

DESCRIPTION OF THE PRIOR ART

It has been envisioned that future computers and like equipment will utilize microelectronic structures. One technique for realizing such compact devices is to use photon couplings between micron size elements. The photon coupling necessitates the utilization of thin film phosphors which can be activated to produce luminescence. It is imperative for practical reasons that the phosphor material have outstanding chemical stability and good efficiency at elevated temperatures.

Most phosphors which have been developed are not suitable for this application because of the loss of efficiency, particularly at temperatures of 400° C. or less. It has been found that $Y_2O_3$:Eu has excellent properties at high temperatures and thus appears to be quite useful for the application of micron size devices. However, a successful method of producing efficient photon producing thin films of this material has not been presented or disclosed. Obviously without a successful method of so producing efficient thin films, the practical application of the material for utilization in photocoupling micron size devices may not be realized.

Thus, an object of this invention is to provide a novel method for making efficient photon producing thin films of $Y_2O_3$ and $Y_2O_3$ doped with rare earth oxides so that the material can be practically utilized for photon coupling and micron size devices.

In accordance with this invention, it has been found that extremely thin films of $Y_2O_3$ and $Y_2O_3$ doped with rare earth oxides upon a suitable substrate can be prepared in a vacuum by electron bombardment evaporation of the oxide powder or powder mixtres. Using this method, it has been found that films of from 1,000 to 2,000 angstroms thickness can be formed upon a substrate. When this is done on a cool substrate, the thin films are not as efficient as the parent powders or sintered compacts. This is to be expected. However, it has been further found that heating of the substrate during such bombardment, to at least 800° C., improves the efficiency. If the efficiency of a $Y_2O_3$ film on an unheated substrate is taken as one, the relative efficiency of a $Y_2O_3$ film which has been deposited on a heated substrate is more than ten times greater.

It has also been found that better results are also obtainable when the films are deposited on a cold substrate and then are additionally subjected to heating to at least 800° C. in an oxygen atmosphere. This may be accomplished by the utilization of an oxygen-gas flame in air or utilization of water vapor during deposition.

The luminescent materials which are deposited as thin films in accordance with this invention are generally the rare earth oxides. Earth oxides of yttrium, gadolinium, europium, and terbium have been deposited on substrates as thin films in accordance with this invention. Additionally, films of yttrium oxide, $Y_2O_3$, doped with rare earth oxides such as dysprosium oxide, europium oxide have also been utilized. In these situations the yttrium oxide serves as the host material while the additional earth oxides serve as an activator. Activation produces energy levels which promote electron transistions accompanied by photon emission. Activation can result from defects alone, as opposed to inclusion of other materials in the host. Thus, when an activator is utilized in combination with yttrium oxide, and in some instances gadolinium oxide, as will be shown in the following examples, the activator is a relatively small mole percent of the total composition. The activators have been utilized in from 1 to 15 mole percent. However, the quantity of activator may vary extensively, depending upon the materials utilized and the desired end results.

The substrate material on which the thin films are formed can be virtually any material capable of being heated to the desired 800° C. or above, and that is compatible with the powders utilized. Examples of such substrates include fused silica, molybdenum, and the like.

In the process of the invention, the powder or powder and activator mixtures are placed in the cup of a conventional electron bombardment evaporator. Alternatively, an electron beam may be utilized to bombard and evaporate the powders. Thus, any source of electrons to evaporate the powders for subsequent deposition is contemplated. The substrate is mounted above the evaporator cup. A bell jar is lowered over the substrate and cup. The jar is then evacuated. In the specific examples performed, a vacuum of $5 \times 10^{-5}$ torr was established.

After the vacuum is drawn the substrate is then heated to the desired temperature. As previously indicated, any suitable heating means is permissible. In the specific examples, the substrates were heated by passing an electric current through them. After the temperature of the substrate is raised to the desired level, the evaporator power is increased slowly until stable conditions exist. The evaporator is then maintained at this level until the desired film is deposited on the substrate. Usually, it has been found that films from 1,000 to 2,000 angstroms in thickness can be produced in from 4 to 6 minutes of evaporation. Obviously, the thickness of the film is dependent upon the quantity of initial powder and more particularly upon the length of evaporation time. An additional factor affecting the thickness of the film is the distance between the cup and the substrate. In the specific examples, the distance between the powder in the cup and substrate was 2 inches. This distance is not critical, it merely affects the thickness of the film and length of deposition time.

Upon completion of the deposition of the film from the evaporated powders upon the substrate, the substrate heater source is turned off. Air is then admitted to the bell jar and the film-coated substrate is then ready for utilization.

The following are detailed examples of the invention which disclose the outstanding results obtained.

EXAMPLE I

A film of $Y_2O_3$ host doped with $Tb_4O_7$ was prepared in accordance with the method disclosed. The $Y_2O_3$ had a 99.999⁹ purity and had a Lindsay code number of 1118. 1.5 mole percent of the activator $Tb_4O_7$ was mixed with the host powder. The $Tb_4O_7$ had a 99.99⁹ purity. About 2 grams of the powder mixture was placed in an electron bombardment evaporator and a substrate of molybdenum was then placed in a vacuum apparatus about 2 inches above the powder and a vacuum of $5 \times 10^{-5}$ torr was drawn. A conventional electron bombardment device was utilized to bombard the powder mixture. The final evaporator power was 0.3 ampere and 3,500 volts. The powder was bombarded with an electron beam for six minutes. During this time, the substrate was heated by passing a current therethrough to a temperature of 800° C. Upon completion of the bombardment, the substrate and coating thereon was removed from the vacuum atmosphere. The resultant film deposited on the substrate was about 1,500 angstroms in thickness.

Relative luminescent efficiency was then tested with a stationary 750 volt, $2.5 \times 10^{-5}$ amp./cm.$^2$ electron beam using an electron gun. An IP28 photomultiplier was placed facing the film side of the substrate for detection of luminescence. Luminescent rise and decay times were measured with a 2,500 volt cathode ray beam, by switching the electron gun on and off with a flat-topped pulse having a 20 nanosecond rise and fall time. The oscilloscope display of the multiplier output was photographed. Response times of the photomultiplier-oscilloscope combination were tested with the aid of a PEK laboratories 2 nanosecond flash lamp and found to be less than $10^{-7}$ second. The indicated relative efficiency of the material was based on using the efficiency of plain $Y_2O_3$ powder arbitrarily chosen as one. The film produced in this example had a relative efficiency of .41. The luminescence was green, the rise time to approximately 90% of the final value was $3 \times 10^{-3}$ seconds and the decay time was found to be $2 \times 10^{-3}$ seconds.

EXAMPLE II

The above procedure of Example I was repeated utilizing various activators with $Y_2O_3$ and $Gd_2O_3$ as a host. The following table indicates the results obtained. The results also show the comparison of utilizing a heated and unheated substrate.

TABLE

| Host | Activator | Relative Efficiency | Luminescent Color | Rise Time (sec.) [a] | Decay Time (sec.) [a] |
|---|---|---|---|---|---|
| $Y_2O_3$ 99.9999[c] | $Eu_2O_3$ (10)[b] 99.999[c] | 0.027 [d](0.006) | Orange-red | $10^{-4}$ | $10^{-4}$ |
| | $Gd_2O_3$ (3) 99.999 | 0.20 | Blue-white | $10^{-3}$ | $10^{-3}$ |
| | $Dy_2O_3$ (3) 99.9 | 0.18 | Yellow-white | $5 \times 10^{-4}$ | $5 \times 10^{-4}$ |
| | $Tb_4O_7$ (1.5) 99.999 | 0.41 | Green | $3 \times 10^{-3}$ | $2 \times 10^{-3}$ |
| $Gd_2O_3$ 99.999 929.91 | $Tb_4O_7$ (1.5) 99.999 | 0.15 | Green-white | $5 \times 10^{-3}$ | $2 \times 10^{-3}$ |
| $Y_2O_3$ 99.99 | None | 0.07 [d](0.003) | Blue-white | $10^{-7}$ | $10^{-7}$ |
| $Y_2O_3$[e] 99.99 | None | 1.0 | Blue-white | $10^{-7}$ | $10^{-7}$ |

[a] To approximately 90% of final values.
[b] Mol percent of activator.
[c] Percent purity.
[d] Deposited on cold substrate.
[e] Powder phosphors.

The importance of a particular color of luminescence is dependent upon the intended application. For example, if photons are used to eject electrons from a metal, it would be desirable to have a blue-to-ultraviolet emission since these photons are more energetic.

Like color, the rise and decay times are also related to the application of the product. If very short pulses of light are desired, then short rise and decay times would be necessary. In a laser application, for example, the longer times are more suitable.

It should be pointed out that the efficiencies obtained are obviously limited to the specific materials and the specific conditions of the examples. Better efficiencies could be obtained through alteration of the proportions of the host and activator. Additionally, the efficiency is dependent on excitation, i.e., beam voltage and current density. The optimum excitation for one phosphor is not necessarily optimum for another.

What is claimed is:

1. A method of forming an efficient photon producing film on a substrate from a phosphor powder selected from a class consisting of rare earth oxide phosphors and rare earth oxide phosphor hosts doped with rare earth oxide phosphor activators comprising placing said powder adjacent to said substrate, vaporizing said powder, condensing said vapors as a thin film on said substrate, and maintaining said substrate at a temperature of at least 800° C. while said vapors are condensing on said substrate.

2. The method of claim 1 wherein said rare earth oxide phosphor hosts consist of oxides of yttrium and gadolinium, and said rare earth oxide phosphor activators consist of oxides of dysprosium, europium, gadolinimum and terbium.

3. A method of forming an efficient photon producing film on a substrate from a phosphor powder selected from a class consisting of yttrium oxide and yttrium or gadolinium oxide doped with a rare earth oxide phosphor activator comprising placing said powder adjacent said substrate, vaporizing said powder with electron bombardment, condensing said vapors as a thin film on said substrate, and maintaining said substrate at a temperature of at least 800° C. while said vapors are condensing on said substrate.

4. The method as recited in claim 3 wherein said rare earth oxide phosphor activators consist of oxides of gadolinium, dysprosium, europium, and terbium.

References Cited

UNITED STATES PATENTS

| 3,274,024 | 9/1966 | Hill et al. |
| 2,998,323 | 8/1961 | Feldman. |
| 3,046,936 | 7/1962 | Simons _____ 117—107.1 |
| 3,047,416 | 7/1962 | Winston. |

UNITED STATES PATENTS 1,347,458  1963  France.

OTHER REFERENCES

Panish and Reif, J. Chem. Phys., 34 (1915–8) 1961.
Panish, J. Chem. Phys., 34 (2197–8) 1961.
Ropp, J. Electrochem. Soc., 111 (3) 311–17, 1964.

ALFRED L. LEAVITT, *Primary Examiner.*

R. L. BROWDY, *Assistant Examiner.*

U.S. Cl. X.R.

117—106; 23—111